No. 12,616. REISSUED MAR. 12, 1907.

J. J. SHEA.

FIBER VESSEL.

APPLICATION FILED JULY 17, 1905.

Witnesses:
Everett S. Emery.
Alice Richmond Brown

Inventor,
John J. Shea,
by Emery Booth + Varrell
Att'ys

UNITED STATES PATENT OFFICE.

JOHN J. SHEA, OF BEVERLY, MASSACHUSETTS.

FIBER VESSEL.

No. 12,616. Specification of Reissued Letters Patent. Reissued Mar. 12, 1907.

Original No. 772,258, dated October 11, 1904. Application for reissue filed July 17, 1905. Serial No. 270,154.

*To all whom it may concern:*

Be it known that I, JOHN J. SHEA, of Beverly, county of Essex, and Commonwealth of Massachusetts, (whose post-office address is Beverly, aforesaid,) have invented certain Improvements in Fiber Vessels, of which the following, read in connection with the accompanying drawings, is a specification.

My invention relates to an improvement in vessels, and more particularly to those vessels composed of material which is primarily flexible at least, such material being placed over a suitable form and given requisite shape, the vessel so constructed being suitable for drinking vessels and for various other uses.

To these ends my invention consists in the provision of a flexible material which is folded and pressed about a suitable form, in combination with means either integral with the flexible material or separate therefrom for retaining the material in the shape to which it is made to conform.

My invention further consists in certain novel details of construction and combinations of parts, such as will be fully described hereinafter and particularly pointed out in the claims.

Figure 1:
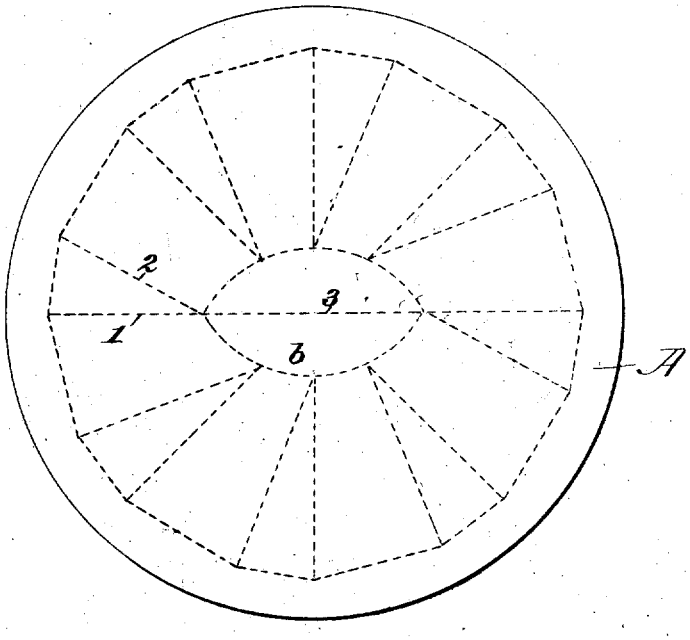
Figure 2:
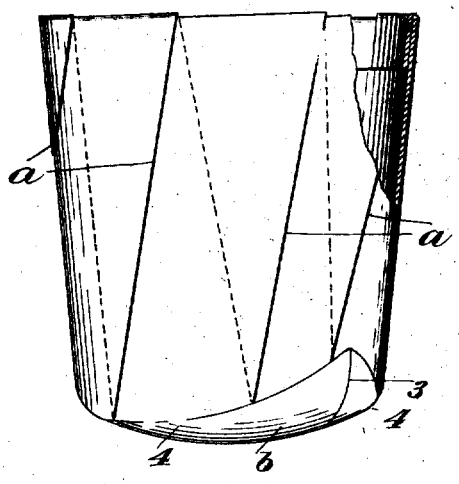
Figure 3:
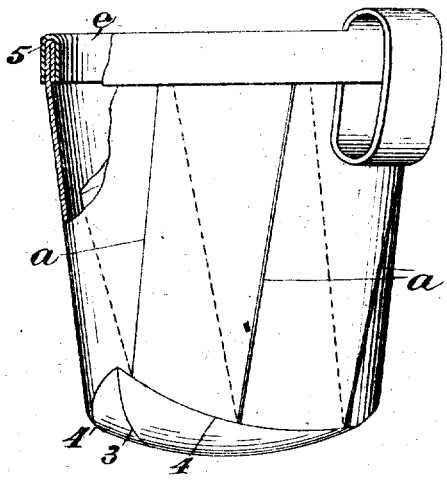

In the accompanying drawings, Figure 1 is a plan view of the blank, showing in dotted lines the positions taken by the folds. Fig. 2 is a view in side elevation of a completed vessel, portions being broken away to show the formation of the upper edge. Fig. 3 is a similar view showing a slight addition applied to the vessel shown in Fig. 2.

In carrying out my invention I provide a blank A, which after folding is provided with an approximately octagonal periphery; but this is not necessarily so, since a greater or lesser number of folds may be made in the blank when forming the vessel. Hence the blank may have a hexagonal, decagonal, or other shaped periphery, as found most desirable. The material of which blank is composed may be of leather, rubber, cloth, paper, or other suitably-flexible material, preferably the paraffined paper of ordinary commercial use, and these blanks may be cut to a suitable size. The blank is then placed upon a form of the size and contour of the desired vessel and is drawn, bent, or folded along the dotted lines 1 2 (shown in Fig. 1) and pressed or molded closely over the form, the lateral surplus of material being formed or taken up in the series of plaits *a a* (shown in Figs. 2 and 3,) which plaits extend upwardly from the bottom of the vessel to the top edge thereof.

The bottom *b* of the vessel is of elliptical shape and constitutes the central portion of the blank, the bottom being preferably folded along its major axis, as shown at 3, to retain the bottom in a bulged or convexed position or to permit it to be folded inwardly within the circular wall when the cup or vessel is collapsed for convenience of carrying or packing, the side walls and rim being at the same time folded along creases extending longitudinally of the vessel from the opposite extremities of the bottom crease 3. The bottom extends upward on the side at either end, creases 4 4 being formed at the point of connection of the circular wall with the bottom.

The edges of the plaits *a a* lie parallel with each other and extend upward at a gentle incline, which would decrease with an increased number of plaits, and vice versa. At those portions where the plaits occur the material is of triple thickness, the plaits gradually increasing in width from a point at the lower end. Thus the inner folds of the plaits are approximately parallel as well as the outer folds, the plaits materially strengthening the vessel and causing it to retain its shape.

When the material has been properly folded and pressed about the form, the edge of the vessel is further strengthened and the plaits *a a* held in place by folding the edge over, preferably inwardly, as shown at 5 in Fig. 2, or a separate strip *e* may be folded over to embrace the edge of the vessel, as shown in Fig. 3, which strip aids in retaining the edge in circular position. If greater strength is desired, the strip *e* may be composed of sheet metal, which may have a handle F, formed integrally therewith, as shown in Fig. 3. Obviously the handle F may be omitted, if desired, and the strip *e* adapted to receive a bail-handle or other suitable carrying or supporting device, according to the use for which the particular vessel is designed. In Fig. 3 it will be noted that the free end of the handle is bent upwardly underneath the folded strip *e*, where it is held.

It will be understood that the blank, when not composed of some waterproof material, may be coated with paraffin or other waterproofing compound, either before or after it is molded, or such coating may be omitted altogether, if desired, the paraffin rendering the vessel both waterproof and antiseptic and should be employed wherever such characteristics are important.

It is obvious that changes other than those hereinbefore noted might be made in the form and arrangement of the several parts described without departing from the spirit and scope of this invention, and hence I do not wish to limit myself to the exact construction herein set forth.

I claim—

1. A receptacle comprising a plain elliptical flexible concavo-convex bottom, a crease extending along the major axis of the elliptical bottom, a plaited side or wall extending at approximately right angles from the bottom and means for retaining the receptacle in assembled position, the bottom adapted to project below or be received within the receptacle as desired.

2. A receptacle comprising a plaited wall and an elliptical flexible bottom, creases at the point of connection of the bottom and wall, a crease formed across the bottom to permit it to protrude beneath or into the space inclosed by the wall as desired, and means for retaining the receptacle in assembled position.

3. A vessel comprising a bottom, a plaited wall, a folded reinforcing-band, the band embracing the upper edge of the plaited wall, and a handle formed integral with the folded band, the free end of the handle adapted to be received between the walls of the folded band.

4. A vessel comprising a bottom, a wall, a reinforcing-band embracing the upper edge of the wall and a handle formed integral with the band and having its free end received between the walls of the band.

5. A seamless collapsible vessel formed from a single piece of flexible material and comprising a bottom having a crease extending across the same to facilitate folding the bottom either inwardly or outwardly and a plaited side wall, a strip of reinforcing material binding the upper edge of said wall to strengthen the wall and retain the plaits in folded position, said wall and rim adapted to be folded upon lines extending longitudinally of the vessel from opposite extremities of the bottom crease, whereby the vessel may be collapsed for convenience when not in use.

In testimony whereof I have signed my name to this specification in the presence of two subscribing witnesses.

JOHN J. SHEA.

Witness:

EVERETT S. EMERY,
RALPH C. POWELL.